Sept. 8, 1936. A. PASCOO 2,053,681
DOOR AND HOOD LOCKING MECHANISM FOR AUTOMOBILES
Filed Aug. 31, 1933 3 Sheets-Sheet 1
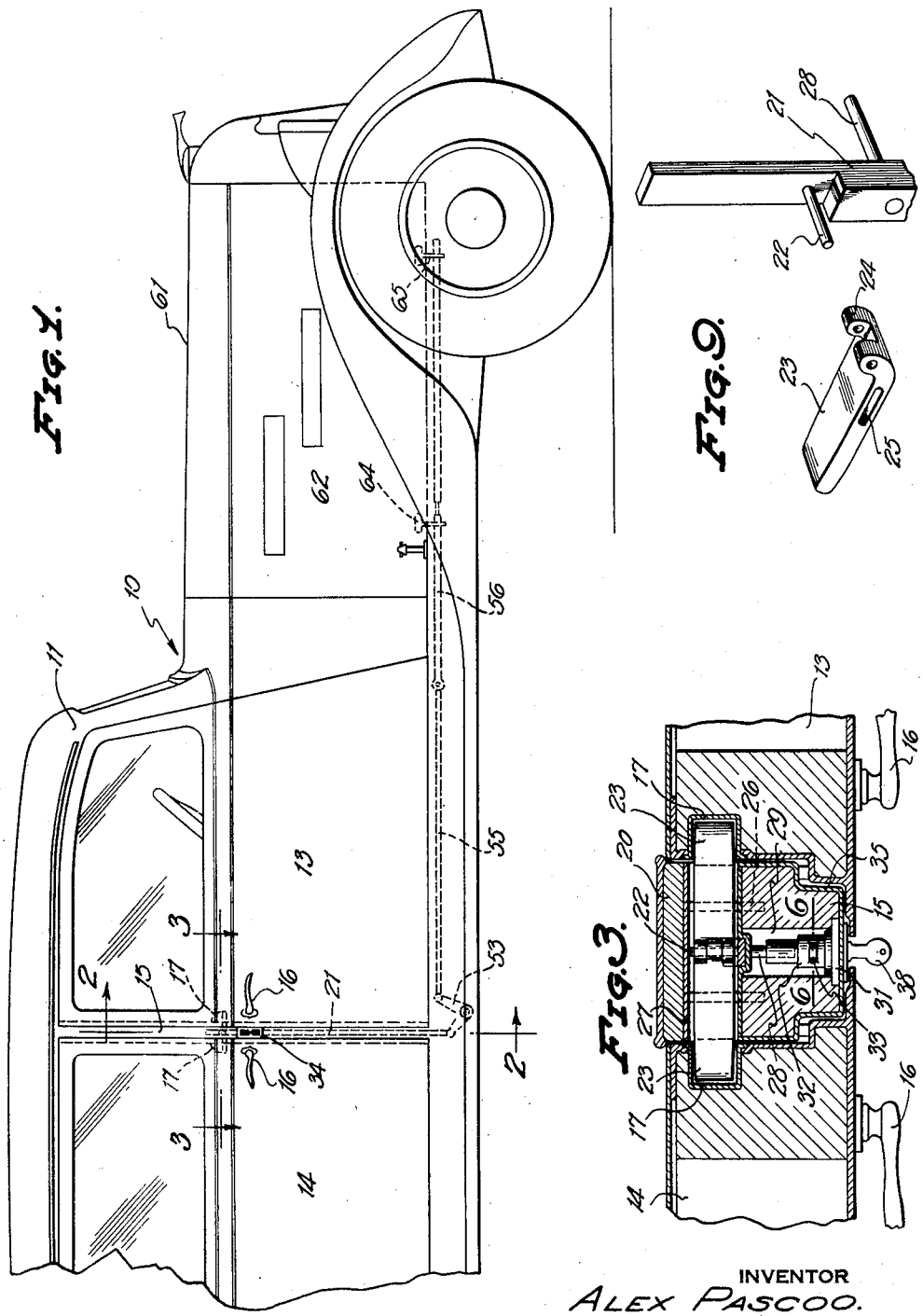
INVENTOR
ALEX PASCOO.
BY
ATTORNEYS
WITNESS:

Sept. 8, 1936.   A. PASCOO   2,053,681
DOOR AND HOOD LOCKING MECHANISM FOR AUTOMOBILES
Filed Aug. 31, 1933   3 Sheets-Sheet 2
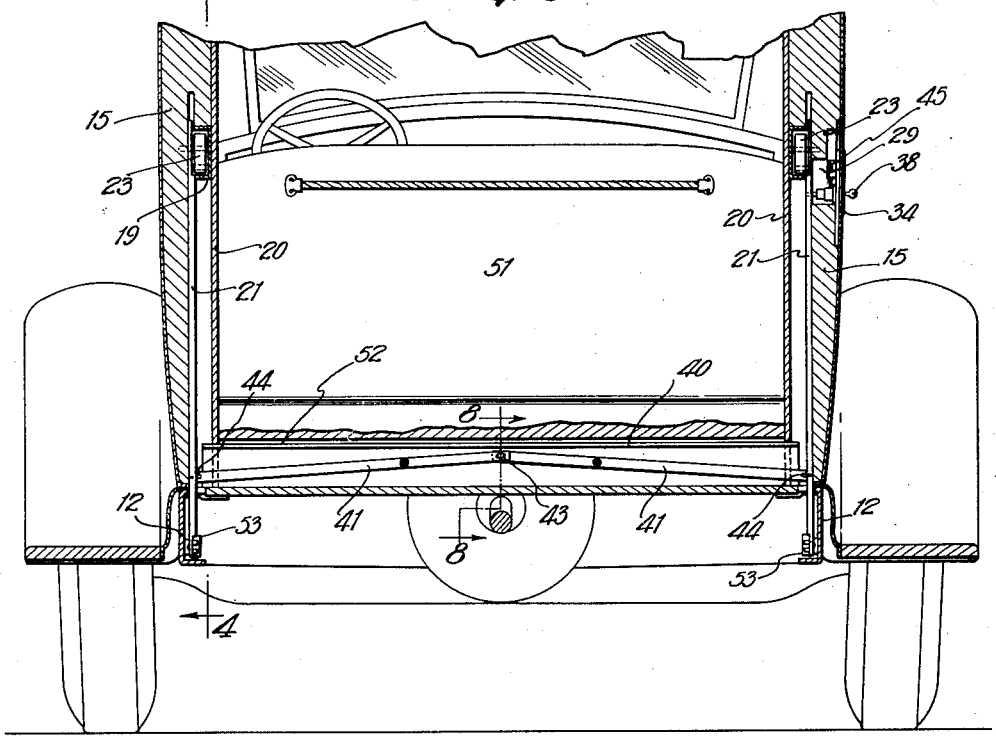
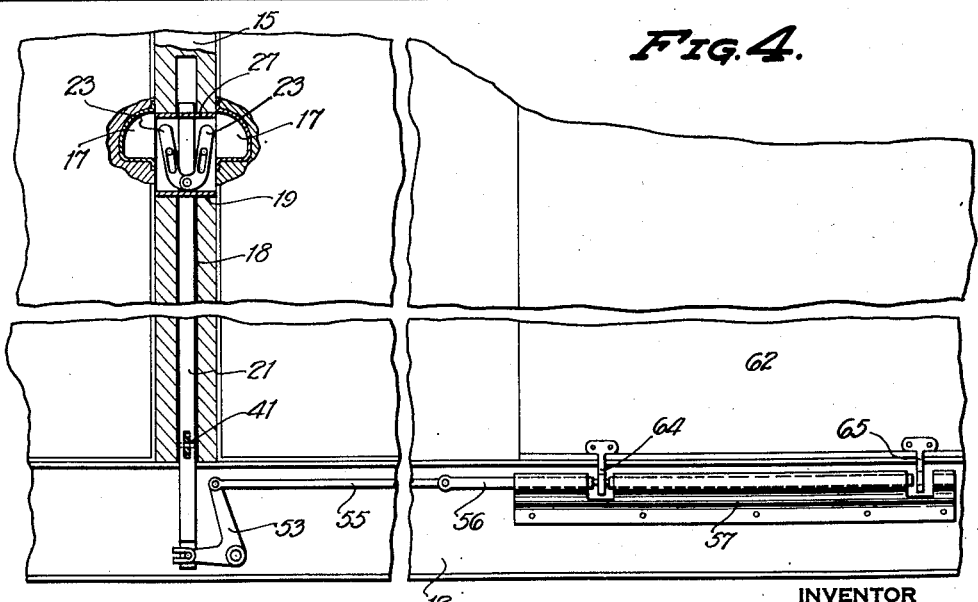
INVENTOR
ALEX PASCOO.
BY
ATTORNEYS
WITNESS:

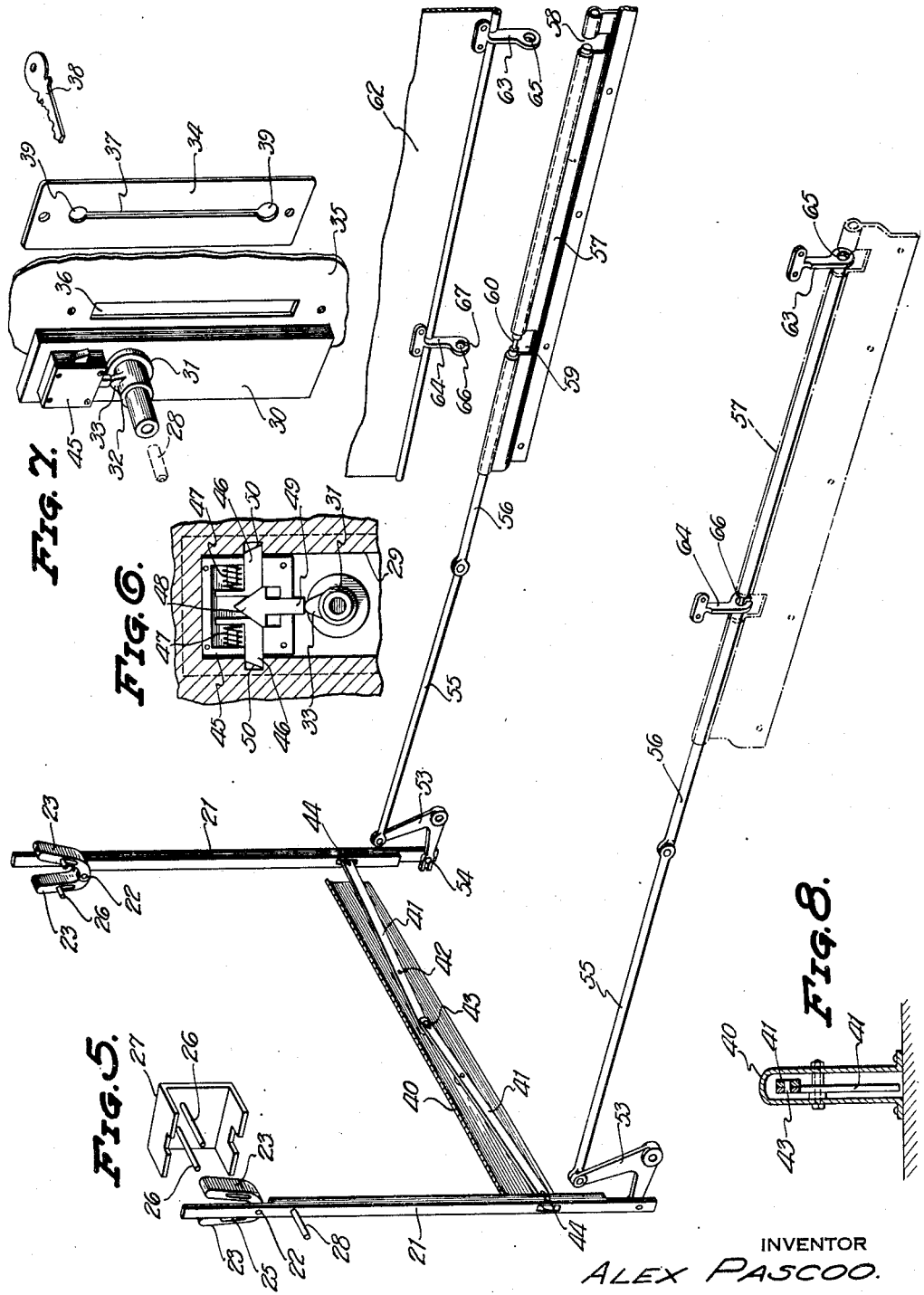

Patented Sept. 8, 1936

2,053,681

UNITED STATES PATENT OFFICE 2,053,681

DOOR AND HOOD LOCKING MECHANISM FOR AUTOMOBILES

Alex Pascoo, New York, N. Y.

Application August 31, 1933, Serial No. 687,543

2 Claims. (Cl. 70—74)

This invention relates to locking apparatus for automobiles of the closed or sedan type.

In the present construction of automobile bodies of the sedan type, it is the general practice to provide means on three of the doors if the body is of the four door type, and such means on one door if the body is of the two door type, which must be manually operated to set the locks thereon, after which the locking of the remaining door by the use of a key is accomplished after the driver has left the car, and which single locking serves to lock all the doors to prevent unauthorized entrance within the car when the same is parked. This system of locking requires careful thought on the part of the owner or driver of the car to make certain that the locks have been properly set, otherwise a door may unknowingly be left unlocked, through which entrance may be easily obtained to the inside of the automobile, subjecting any valuables left therein to theft as well as the automobile itself. Therefore, the primary object of the invention resides in a system of locking which requires no presetting of the locks of the doors, and yet causing all of the doors to be locked and unlocked by the actuation of a single key controlled mechanism.

Another object of the invention is the provision of a means for locking the sections of an automobile hood simultaneously with the locking of the doors of the automobile to prevent unauthorized tampering with the working parts enclosed thereby while parked, and during the absence of the driver.

Another object of the invention is to provide a system of locking the doors and hood of an automobile, which may be used with the present body construction without requiring radical changes in the construction thereof.

A still further object is the provision of an automobile locking mechanism having the above features which is simple and inexpensive of construction, positive of operation, and which does not detract from the appearance of the automobile on which it is installed.

With these and other objects in view, the invention resides in the certain novel construction, combination and arrangement of parts, the essential features of which are hereinafter fully described, are particularly pointed out in the appended claims, and illustrated in the accompanying drawings, in which:

Figure 1 is a fragmentary side elevational view of an automobile of the four door sedan type with my invention embodied therein.

Figure 2 is an enlarged vertical transverse sectional view on the line 2—2 of Figure 1.

Figure 3 is an enlarged detail horizontal sectional view on the line 3—3 of Figure 1.

Figure 4 is a vertical sectional view on the line 4—4 of Figure 2.

Figure 5 is a perspective view of the locking mechanism per se.

Figure 6 is an enlarged detail vertical sectional view on the line 6—6 of Figure 3.

Figure 7 is a perspective view of the master lock and door actuating slide, certain parts being shown in separated condition.

Figure 8 is an enlarged detail vertical sectional view on the line 8—8 of Figure 2.

Figure 9 is a detail perspective view of one of the door locking bolts and its support and actuating bar.

Referring to the drawings by reference characters, the numeral 10 designates an automobile of the four door sedan type including a body 11 supported upon a chassis 12, and which body is provided with two front doors 13 and two rear doors 14 respectively disposed on opposite sides of the body. The front and rear doors 13 and 14 are hingedly mounted and swing to a closed position against a single post or jamb 15 and are provided with the usual hand actuated locks 16. The jamb engaging faces of the doors 13 and 14 are provided with keeper recesses 17 which receive locking bolts presently to be described. The keeper recesses 17 on each pair of side doors are disposed adjacent and opposite each other when the doors are in closed position as shown in dotted lines in Figure 1 of the drawings.

Each post or jamb 15 has its inner face provided with a vertical groove or channel 18, which channel extends from the lower end of the post and communicates with an enlarged recess 19 extending the width of the post. A moulding strip 20 is removably secured to the inside of each post 15 to conceal the parts contained in the channel 18 and recess 19 and which parts will now be described.

Slidable in each of the vertical channels 18 in the post 15 is a bolt actuating bar 21, the upper end of which is reduced in thickness and the reduced portion carries an inwardly extending pivot pin 22. The pivot pin 22 supports a pair of bolt members 23, the pivoted end of one of the bolt members being provided with spaced ears 24 while the other bolt member has a single ear interfitting between the spaced ears in a manner similar to the sections of a hinge in order that the two bolts may be disposed on the same plane.

Elongated slots 25 extend transversely through the bolt members 23 and receive the pins 26 carried by a substantially U shaped metal housing 27 which snugly fits into the enlarged recess 19 for frictional engagement with the walls thereof.

The structure above described is present in the post 15 on opposite sides of the automobile, but the bolt actuating bar 21 on the right hand side of the vehicle is provided with an outwardly extending pin 28 which extends outwardly into a vertical slot 29 provided in the post 15. Slidably mounted for vertical movement against the outside of the post 15 at the right hand side of the automobile, is an actuating slide member 30 which carries a pin-tumbler lock 31, the pin 28 extending into the rotatable barrel 32 thereof. The barrel 32 is provided with a cam member 33. The actuating member 30 is counter sunk in the outer face of the post 15 and an escutcheon plate 34 is secured to the post to overlie the slot 29 and to conceal the slide 30. However, the slide 30 is partially concealed by the metal molding strip 35 usually provided in body constructions for enclosing the wooden post 15. As shown in Figure 7, the molding strip 35 is provided with an elongated slot 36, while the escutcheon plate 34 is provided with a narrow vertical slot 37, of a width to enable the sliding of a key 38. The ends of the slot 37 terminate in enlarged openings 39 to enable the key 38 to be turned when disposed at opposite ends of the slot 37 and for permitting the insertion and removal of the key from the lock construction 31.

From the above description, it will be seen that by inserting the key 38 into the lock 31, the key constitutes a manipulating element for permitting the vertical sliding of the slide actuating member 30 which causes a corresponding movement to be imparted to the bolt actuating bar 21 at the right side of the automobile. This movement is transmitted to the other actuating bar 21 or to that particular bar located on the left side of the automobile. For the purpose of transmitting sliding movement to the actuating bar 21 on the left side of the vehicle, there is provided a transversely disposed shield 40 of substantially inverted U shape in cross section, and which shield is fixed to the flooring of the body and extends transversely thereof. Pivotally mounted within the shield 40 are two levers 41, their pivots 42 being disposed intermediate the ends thereof. The inner ends of the levers are joined by a pin and slot connection 43, while the outer ends of the said levers are connected to the respective actuating bars 21 by a pin and slot connection 44. By reference to Figure 5 of the drawings, it will be seen that by actuating the pin 28 up or down by reason of the actuating slide 30, both members 21 will move simultaneously in the same direction. Assuming that the doors 13 and 14 are closed, the key 38 is inserted into the lock mechanism through the lower enlarged opening 39 in the escutcheon plate 34, it follows that by pulling upwardly upon the key, the two bars 21 will likewise move upwardly and in so doing, the guide pins 26 act to cause the pairs of bolts 23 to move to extended position into the keeper recesses 17. A corresponding sliding movement of the key 38 in a downward direction will move the actuating bars 21 downwardly and the pins 26 act to move the pairs of lock bolts 23 to retracted position.

For the purpose of locking the actuating slide member 30 in a raised position at which time the lock bolts 23 are extended, there is provided a lock 45 on the inner side of the actuating member 30 directly above the pin-tumbler lock 31. The lock 45 includes a pair of sliding bolts 46 normally movable to a retracted position by the action of springs 47. The bolts 46 are expanded by the upward movement of a spear head 48, the same being slidably mounted and having a tail portion or shank 49 adapted to be engaged by the cam 33 on the barrel 32 of the pin-tumbler lock 31. Keeper recesses 50 are provided in opposite walls of the slot 29 to receive the outer ends of the bolt 46 when in extended position, the keeper recesses being disposed adjacent the top of the slot 29 so as to receive the bolt at the limit of the upward vertical movement of the actuating slide member 30. Thus it will be seen that after the slide member 30 has been moved upwardly to the limit of its sliding movement, the key 38 may be turned and the cam 33 brought to the position shown in Figure 6 whereupon it engages the tail 49 of the bolt actuating member causing the spear head 48 to spread the bolt 46 against the action of the springs 47. The turning of the key to unlocking position will cause the cam 33 to move away from the tail of the shank 48, whereupon the springs 47 will return the bolt 46 to a retracted position out of engagement with the keeper recesses 50. Thus the slide 30 is free to be moved downwardly by the key 28 to cause the releasing of the lock bolts 23 from the keepers in the respective doors.

The shield 40 extends transversely of the body beneath the front seat 51, the under side of the seat being provided with a transversely disposed channel 52 for receiving the shield. In seats of the adjustable type, the width of the channel 52 may be greater than the width of the shield member to accommodate the adjustment of the seat 51.

Having described the manner in which the four doors of an automobile may be locked and unlocked, I shall now describe the manner in which the swinging sections of the hood of the automobile may be correspondingly locked and unlocked and simultaneously with the locking and unlocking of the door. Pivoted to opposite sides of the chassis frame 12, are bell crank levers 53, one of the arms of the levers being connected to the lower end of the actuating bars 21 by means of a pin and slot connection 54. The other arms of the bell cranks have one end of links 55 pivoted thereto, the said links extending forwardly of the chassis frame and substantially parallel thereto. The forward ends of the links are pivotally connected to lock rods 56, slidably mounted in bearing members 57, and which bearing members are fixed secured to the inside of the chassis frame 12. The forward ends of the bearing members 57 are provided with notches 58, while the rearward ends of the same are provided with similar notches 59. The locking rods 56 are of such length that when in retracted position, they clear the notches 58, while the lock bars are reduced in diameter as at 60 for registration with the notches 59 when the ends of the locking bars are clear of the notches 58. This construction is best seen in Figure 5 of the drawings. The two sections of the automobile hood 61 are designated at 62, and the lower ends of the sections 62 are provided with brackets 63 and 64. The brackets 63 are provided with closed eyes 65 whereas the brackets 64 are provided with eyes 66 which open through restricted slots 67. The brackets 63 and 64 are so positioned upon the hood sections that when the hood sections are closed, the said brackets enter the respective notches 58 and 59. When the lock bars 56 are in retracted position, the eyes 65 of the brackets 63 aline with the ends of the lock bars whereas the restricted slot or passage 67 in the brackets 64 permit the reduced portion 60 to enter the eyes 66, whereupon forward movement of the lock bars 56 causes the ends of the same to enter the eyes 65 and the reduced portion 60 to move out of the eyes 66 and a portion of the lock bars 56 of a larger diameter to enter the eyes 66. Thus the swinging sections 62 of the hood may be locked. By connecting the lock bars 56 to the bars 21 through the bell cranks 53 and links 55, it will be seen that upward sliding movement of the bars 21 will move the lock bars 56 forwardly to locking position while downward movement of the bars 21 will cause the lock rods 56 to move rearwardly to unlocking position.

From the foregoing description, it will be seen that all the doors of an automobile of the sedan type may be simultaneously locked by a single actuation while the sections of the hood are simultaneously locked. This assures absolute protection against entrance within the body of the automobile, and unauthorized tampering with the motor and other parts contained beneath the hood. Thus, the driver or owner of an automobile equipped with my locking system may leave the same parked, knowing that any valuables left within the body are safe from theft and that the vital working parts of the motor cannot be tampered with.

Although I have shown and described my invention as applied to an automobile of the four door sedan type, it will be understood that the same may be also embodied in automobiles of the two door type, but in such instances, single locking bolts 23 are used instead of the opposed pairs as herein disclosed.

While I have shown and described what I deem to be the most desirable embodiments of my invention, I wish it to be understood that such changes as come within the scope of the appended claims may be resorted to if desired.

Having thus described the invention, what I claim as new and desire to secure by Letters Patent of the United States, is:—

1. In an automobile body of the sedan type having swinging doors at opposite sides thereof, opposed bars slidably mounted in opposite sides of said body for vertical movement, a pair of pivotally supported rock levers extending transversely of said body adjacent the floor thereof, the inner ends of said levers being pivotally connected, the outer ends of said levers being respectively pivoted to said bars, a housing shielding said bars, locking bolts pivotally carried by said bars for movement to an extended locking position or to a retracted unlocking position and adapted to engage in keeper recesses provided in said doors for receiving said bolts when in an extended locking position, and manual actuating means accessible exteriorly of said body at one side thereof for imparting vertical sliding movements to one of said bars.

2. In an automobile body of the sedan type having swinging doors at opposite sides thereof, opposed bars slidably mounted in opposite sides of said body for vertical movement, a pair of pivotally supported rock levers extending transversely of said body adjacent the floor thereof, the inner ends of said levers being pivotally connected, the outer ends of said levers being respectively pivoted to said bars, a housing shielding said bars, locking bolts pivotally carried by said bars for movement to an extended locking position or to a retracted unlocking position and adapted to engage in keeper recesses provided in said doors for receiving said bolts when in an extended locking position, manual actuating means accessible exteriorly of said body at one side thereof for imparting vertical sliding movements to one of said bars, and key controlled lock means for locking said means in bolt locking position.

ALEX PASCOO.